United States Patent [19]

Thompson

[11] 4,168,602

[45] Sep. 25, 1979

[54] BLOCK COPOLYMER OF POLY (DIOXAARYLAMIDE) AND POLYAMIDE AND FIBERS AND FIBROUS MATERIAL PRODUCED THEREFROM

[75] Inventor: Robert M. Thompson, Wilmington, Del.

[73] Assignee: Sun Ventures, Inc., Radnor, Pa.

[21] Appl. No.: 773,740

[22] Filed: Mar. 2, 1977

Related U.S. Application Data

[63] Continuation-in-part of Ser. No. 557,428, Mar. 11, 1975, abandoned, which is a continuation-in-part of Ser. No. 415,610, Nov. 14, 1973, abandoned.

[51] Int. Cl.$^2$ .................. B32B 27/02; B32B 27/34; D02G 3/02
[52] U.S. Cl. .......................... 57/243; 66/202; 139/420 R; 260/857 TW; 264/176 F; 428/225; 428/288
[58] Field of Search .............. 57/140 R, 243; 66/202; 139/420 R; 264/176 F; 428/288, 225; 260/857 TW

[56] References Cited

FOREIGN PATENT DOCUMENTS 565350 11/1944 United Kingdom.
615954 1/1949 United Kingdom.
1304865 1/1973 United Kingdom.

*Primary Examiner*—J. C. Cannon
*Attorney, Agent, or Firm*—J. Edward Hess; Donald R. Johnson; Anthony Potts, Jr.

[57] ABSTRACT

Novel block copolymer formed by melt blending a melt spinnable polyamide, such as nylon-6, and a poly(dioxaarylamide), such as poly(4,7-dioxadecamethylene terephthalamide) (also known as N-30203-T), is disclosed. Said copolymer has utility as a fiber. The fiber of a block copolymer, for example of nylon-6 and said poly(dioxa-arylamide) which is also known as N-30203-T/6, has superior moisture absorption and initial modulus characteristics than that of nylon-6. Furthermore, resulting fiber still substantially maintains the other desirable properties of the major constituent, for example, nylon-6.

47 Claims, No Drawings

BLOCK COPOLYMER OF POLY (DIOXAARYLAMIDE) AND POLYAMIDE AND FIBERS AND FIBROUS MATERIAL PRODUCED THEREFROM

CROSS REFERENCE TO RELATED APPLICATIONS

This application is a continuation-in-part of U.S. patent application Ser. No. 557,428, filed Mar. 11, 1975, and now abandoned, which in turn is a continuation-in-part of U.S. application Ser. No. 415,610, filed Nov. 14, 1973, and now abandoned, the latter is related to U.S. application Ser. No. 415,582, filed Nov. 14, 1973, and now abandoned, by Robert M. Thompson and Richard S. Stearns, title of the application is: "Copolymer of Blocks of Alternating Poly(dioxa-amide) and Polyamide". Also related is U.S. application Ser. Nos. 415,583 and 418,524, both filed Nov. 14, 1973, and both now abandoned, by present inventor and titled "Block Copolymer of Poly(oxa-amide) and Polyamide", and "Block Copolymer of Poly(dioxa-amide) and Polyamide", respectively. Also related is Ser. No. 415,581, filed Nov. 14, 1973, and now abandoned, by Elmer J. Hollstein. Subject matter of the last application relates to a method for the hydrogenation of a dinitrile, which is a precursor of a hydrophilic polymer disclosed within the aforementioned related applications.

BACKGROUND OF THE INVENTION

It is known that commercially important polyamides, such as nylon-6, have excellent physical properties in many respects. However, for certain textile applications fabrics and similar products prepared from such nylons are somewhat deficient in moisture absorption as compared to a natural fiber such as cotton. This characteristic is important because according to ENCYCLOPEDIA OF POLYMER SCIENCE, Vol. 10, Section Polyamide Fibers, moisture absorption determines comfort factors, ease and cost of dyeing, antistatic character and hand or feel of the fabric. To overcome this moisture absorption deficiency many attempts have been made, but none have been commercially successful to date.

Disclosed herein is a novel block copolymer which can be converted into a fiber having moisture absorption properties superior to that of commercially used polyamides such as nylon-6. This block copolymer consists of a certain polyamide and a certain poly(dioxa-arylamide). Surprisingly, the incorporation of a certain poly(dioxa-arylamide) into a certain polyamide does not adversely effect the many desirable fiber properties of the polyamide and, in fact, improvement in certain mechanical properties such as initial modulus and strength can be obtained. Furthermore incorporation of said poly(arylamide) materially improves its moisture absorption property. Also the copolymer can be formed into a desired shape by extrusion, injection molding and other well-known thermoplastic forming methods.

A block copolymer can result when a mixture of polymer Y and polymer Z, both of which contain amides, is properly processed. Thus the resulting block copolymer contains relatively long chains of a particular chemical composition, the chains being separated by a polymer of different chemical composition; thus diagrammatically

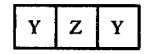

Another type of a block copolymer is one which contains relatively long chains of a particular chemical composition which are separated by a low molecular weight "coupling group", thus diagrammatically

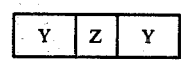

Each of the aforementioned polymer chains, i.e., Y and/or Z, can be a homopolymer or a random copolymer.

Generally, copolymers containing an amide functional group, i.e.,

can be formed by melting two polyamides. Thus, when two different polyamides are mixed and heated above their melting point copolymers are formed. This process is also known as melt blending. However, the length of time the polymers are maintained at a temperature above their melting points has a profound effect on the resulting structure. As the mixing at the elevated temperature begins the mass is a physical mixture of two different compounds. But gradually as the heating and mixing continues the mixture is converted into a copolymer characterized as a "block" copolymer. However, if the heating and mixing continues the length of the "blocks" decrease and sequences of "random" copolymers appear. If the heating and mixing occurs for a sufficient time most of the "blocks" disappear and mostly random sequences form as evidenced by deterioration of its physical properties including melting point. At present there is no known direct way of determining chain sequence of such a polymer. But indirect methods exist and are known to those skilled in the art. Controlled decomposition of such a copolymer will yield all identifiable components that make up the copolymer but will not indicate sequences.

Polymers, including copolymers, containing amide functional groups generally result from a reaction known as condensation. Condensation refers to a polymer forming reaction in which water is a by-product. The various types of polymers that can be produced from condensation (or step growth polymerization) are described hereinafter. The initial stage of a condensation polymerization consists of random combinations of two monomeric units to form dimer molecules. Examples of these could be the formation of two units of nylon-11 from the corresponding amino acid (11-aminoundecanoic acid) in the case of an AB polyamide

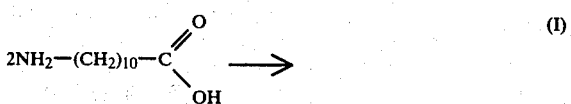

-continued

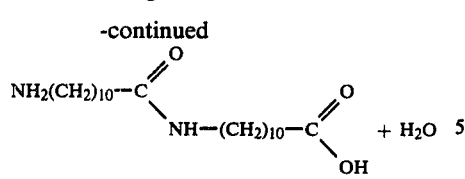

+ H₂O or adipic acid molecule and hexamethylene diamine in an AABB system

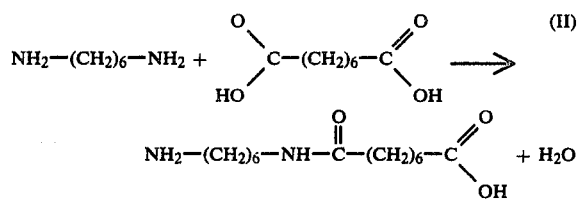

The letter "A" refers to one of the functional groups of the monomer, "B" refers to the other.

The foregoing dimer molecules will combine with equal facility with another monomeric unit or a dimer unit. In this fashion, the average degree of polymerization ($\overline{DB}$) builds during the course of the reaction. This is discussed in greater detail in ORGANIC CHEMISTRY OF SYNTHETIC HIGH POLYMERS, Robert W. Lenz, Library of Congress Catalog Card No. 66-22057.

In the same manner, as reactions I and II, random copolymers can be formed. The only condition necessary is that more than one type (or two if an AABB system is used) of monomer unit be present during the condensation reaction. Thus following from the example above where monomers of AB and AABB polymers are present in the same reactor at the beginning of the polymerization, the AB monomer (amino acid) will react with a similar unit or the AABB monomer unit (the diamine or diacid) in a random fashion since their reactivities are similar. The final result of such a polymerization will be a random copolymer. If their reactivities are very dissimilar, there would be a tendency to become blocks, however, units having similar carboylic and/or similar amine ends have similar reactivities. Further examples of random copolymers are given in U.S. Pat. No. 3,397,107, where the monomer units of nylon 303/T and caprolactam are polymerized in a random fashion. Another example is contained in U.S. Pat. No. 3,594,266, in which a polyethylene oxide diamine, terephthalic acid and caprolactam were polymerized in a random fashion. Since the condensation polymerization is a random sequence of events it would be extremely improbable to obtain an alternating copolymer using dissimilar monomer units in the condensation reaction as it is known today. An alternating copolymer can be classified as a special type of random copolymer.

Formation of a condensation block copolymer cannot be easily achieved using the conditions described heretofore because of the random reaction of monomeric units. Block copolymer preparations have been described in the patent literature using at least two techniques. One technique, as described before, is melt blending two homopolymers at temperatures where the polyamide becomes reactive to imide interchange, chain extension and hydrolysis. Such a technique is disclosed in U.S. Pat. No. 3,393,252. When the conditions are closely controlled block copolymers with a distribution of optimum lengths can be prepared.

Another method of preparing block copolymers is described in U.S. Pat. No. 3,683,047. It consists of polymerizing two homoprepolymers of low molecular weight from such as 1000 to 4000. In this specific case, one prepolymer was carboxyl terminated while the other was amine terminated. The result of the polymerization is a block copolymer. Under the conditions of polymerization very little randomization occurred as indicated by little loss in melting point during the blend time. These block copolymers have been called ordered copolymers since by the nature of the starting materials reactive functional groups cannot react with themselves.

Because of the complexity in naming the copolymers of polyamide and poly(dioxa-amide), a shorthand nomenclature is used herein. It is based in part on the nomenclature used to identify aliphatic polyamides. Numbers signify the number of carbon atoms in a polymer. The letter "O" signifies oxygen and its relative location within the polymer; "N" signifies polyamide linkage; "T" signifies terephthalic. Thus "30203" refers to a diamine function while "6" refers to the diacid function. Therefore, "6" refers to six carbon paraffinic diacid and in particular adipic acid. Also "30203" indicates the number of paraffinic carbons and the "O" indicates the placement of oxygen. In this nomenclature a slash (/) designates a random copolymer whereas a double slash (//) indicates a block copolymer. Thus N-30203-6//6 indicates that blocks of N-30203-6 are connected within the copolymer with blocks of "6" (nylon-6).

Contrary to expectations based on the previously discussed art it has now been found that it is possible to prepare a composition comprising a block copolymer of polyamide and poly(oxaamide) having a moisture uptake better than that of its polyamide precursor, e.g. nylon-6. In addition fibers of the copolymer have overall fiber properties substantially equivalent to that of such nylons as nylon-6.

SUMMARY OF THE INVENTION

Present invention resides in a novel composition. It has utility as a fiber along with other utilities. The composition is a block copolymer of a certain polyamide and a certain poly(dioxa-arylamide). The polyamide portion of the molecule is a bivalent radical of a melt spinnable polyamide having no ether linkage. The poly(dioxa-arylamide) portion of this molecule contains both a double oxygen linkage, e.g., —R—O—R—O—R— and amide linkage, i.e.

The following repeating structural formula depicts the composition of this invention:

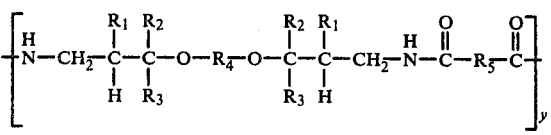

$$-\left[\begin{array}{c}\text{bivalent}\\\text{radical}\\\text{of melt}\\\text{spinnable}\\\text{polyamide}\\\text{having no}\\\text{ether linkage}\end{array}\right]_z$$

wherein $R_1$, $R_2$, and $R_3$ are selected from the group consisting of H, $C_1$–$C_{10}$ alkyls and $C_3$–$C_{10}$ isoalkyls; $R_4$ is selected from the group consisting of $C_1$–$C_{10}$ alkylenes and $C_3$–$C_{10}$ isoalkylenes; $R_5$ is a $C_6$–$C_{14}$ arylene; and y=4-200 and z=4-200. The copolymer has a molecular weight by about 5000–100,000.

DESCRIPTION

As stated heretofore one portion of the novel composition is a melt spinnable polymer having no ether linkage. Melt spinnable refers to a process wherein the polymer, a polyamide, is heated to above its melting temperature and while molten forced through a spinneret. The latter is a plate containing from one to many thousands of orifices, through which the molten polymer is forced under pressure. The molten polymer is a continuous filament and depending on the number of orifices many filaments can be formed at the same time. The molten filaments are cooled, solidified, converged and finally collected on a bobbin. This technique is described in greater detail in ENCYCLOPEDIA of POLYMER SICENCE AND TECHNOLOGY, Vol. 8, Man-Made Fibers, Manufacture.

If a single fiber is extruded as in the case when it is intended to be knitted into hosiery, the product is called a monofilament. When the product is expected to be converted into a fabric by knitting or weaving, the number of monofilaments is in the range of 10–100. Such a product is known as a multifilament yarn. Yarns for industrial applications such as in the construction of tire cords, usually contains several hundred to a thousand or more filaments. When the fibers are used to make a spun yarn, i.e., a yarn formed by twisting short lengths of fibers together, as in the practice with cotton, the number of orifices can use to tens of thousands. The extruded material is cut into pieces in the range of 1–5 inches long to produce staple fiber. This staple fiber is converted into spun yarn in the same manner as cotton. Polymer of present invention can be prepared into the aforementioned forms by the various methods described.

Also, the polymers of present invention can be used to prepare nonwovens. Nonwoven refers to a material such as fabric made without weaving and in particular having textile fibers bonded or laminated together by adhesive resin, rubber or plastic or felted together under pressure. Many such methods are described in detail in MANUAL OF NONWOVENS, Prof. Depl-Ing and Dr. Radko Kroma, Textile Trade Press, Manchester, England.

Polyamides which are crystallizable and have at least a 30° C. difference between melting point and the temperature at which the molten polymer undergoes decomposition can be melt spun. Examples of melt spinnable polyamides having no ether linkages are as follows: nylon-6,6 (also known as poly (hexamethylene adipamide) nylon-6,10)-poly(hexamethylene sebacamide)); nylon-6 (poly(pentamethylene carbonamide)); nylon-11 (poly(decamethylene carbonamide)); MSD-6 (poly(-metaylylene adipamide)); PACM-9 bis(paraminocyclohexyl)methane azelamide; PACM-10 bis(paraaminocyclohexyl) methane sebacamide; and PACM-12 bis(-paraminocyclyhexyl)methane dodecano-amide; others are listed in ENCYCLOPEDIA OF POLYMERS SCIENCE AND TECHNOLOGY, Vol. 10, Section Polyamide Fibers, table 12. Methods for preparing these polyamides are well known and described in numerous patents and trade journals.

The poly(dioxa-arylamide) portion of the composition can be prepared by the following generalized scheme:

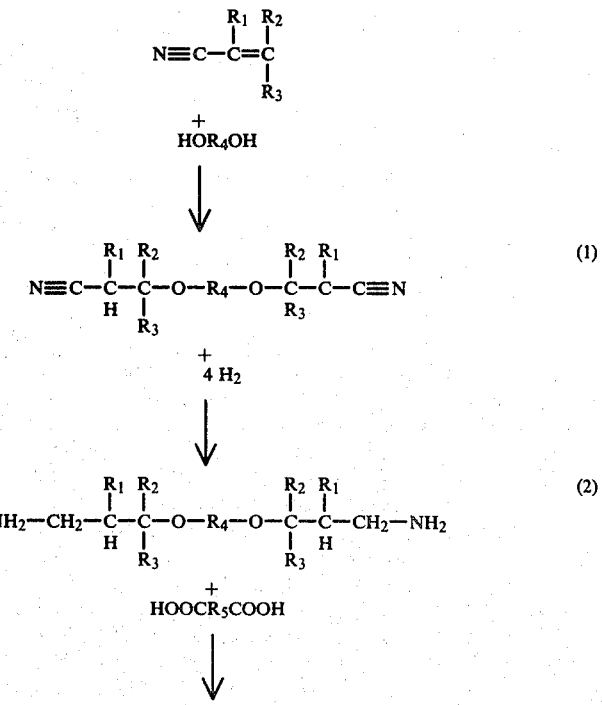

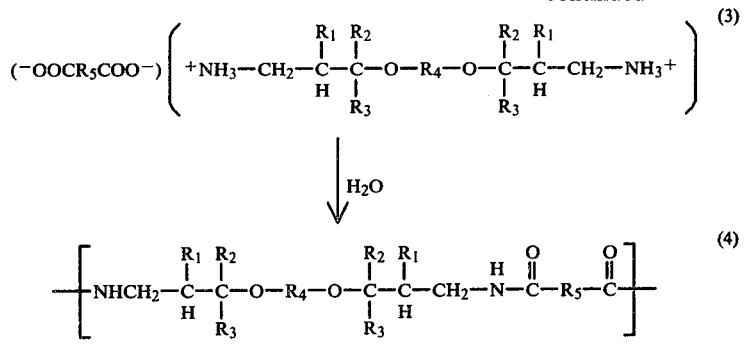

Reaction (1) is often referred to as cyanoethylation; particularly wherein $R_1$, $R_2$ and $R_3=H$; also these R's can be $C_1-C_{10}$ alkyls or $C_3-C_{10}$ isoalkyls. Reaction (2) is a hydrogenation. Reaction (3) is the reaction between a diacid and diamine resulting in a salt. $R_5$ is a $C_6-C_{14}$ arylene. Reaction (4) is often referred to as a condensation polymerization. Here the repeating unit contains fewer atoms than the monomer, and necessarily, the molecular weights of the polymer as formed is less than the sum of the molecular weights of all the original monomer units which were combined in the reaction to form the polymer chain. Examples of $C_1-C_{10}$ alkyls are methyl, propyl, butyl, pentyl, etc; examples of the $C_3-C_{10}$ isoalkyls are isopropyl, isobutyl, isopentyl and the like. Examples of $C_6-C_{14}$ arylenes are naphthylene, phenylene, tolylene and the like. Examples of $HOR_4OH$ of reaction (1) are as follows: ethylene gycol, propylene glycol and trimethylene glycol. Examples of $HOOCR_5COOH$ are as follows: o-phthalic, m-phthalic, p-phthalic, o,o'-bibenzoic and naphthalene dicarboxylic.

Examples of poly(dioxa-arylamide) polymer that can be prepared in the aforementioned generalized scheme are the following:

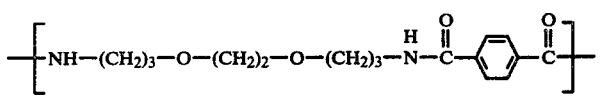

poly (4,7-dioxadecamethylene terephthalamide) also N-30203-T

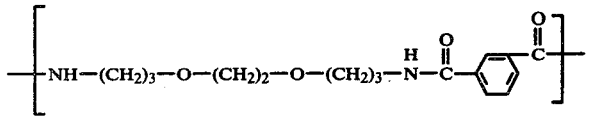

poly (4,7-dioxadodecamethylene isophthalamide) als N-30203-I

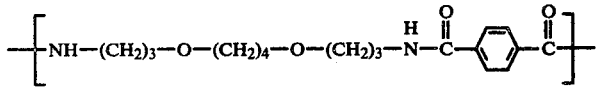

poly (4,9-dioxadodecamethylene terephthalamide) also N-30403-T

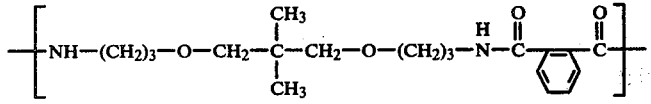

poly (4,8-dioxa-6,6-dimethylundecamethylene terephthalamide)

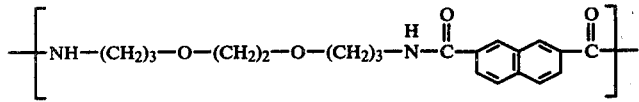

poly (4,7-dioxadecamethylene-2,7-naphthylamide

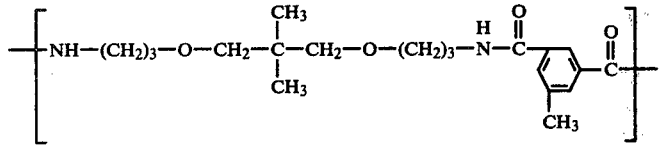

poly (4,8-dioxa-6,6-dimethylundecamethylene tolylamide-3,5)

The aforementioned blocks of poly(dioxa-arylamide) and melt spinnable polyamide can contain as few as 4 repeating units within the polymers of present invention. Thus y and z both can equal 4. Data reported in the Example shows that a melt spinnable polyamide, as an illustration, having four repeating units has an estimated melting point which does not differ substantially from the melting point of a relatively high molecular weight polymer. Thus each four repeating unit blocks, when present in a block copolymer, can retain its own particular properties without substantially degrading the properties of the other repeating unit block. To minimize loss of properties the preferred minimum values for y and z are 8 and more preferred values are 10.

Preferred maximum values of y and z are 175 and 185, respectively, more preferred values are 150 and 160. Values of y and z are median values.

The polymers of present invention can also contain an antioxidant such as 1,3,5-trimethyl-2,4,6-tris-(3,5-ditertiary-butyl-4-hydroxybenzyl) benzene. Small amounts of antioxidant, e.g., 0.5 weight percent, are satisfactory, however, as little as 0.01 weight percent can be used or as much as 2.0 weight percent also can be satisfactory. Antioxidants other than the aforementioned one can be used. The antioxidant generally would be mixed in combination with the two polymers prior to melt blending. Other usual additives for polyamides such as delusterants and/or light stabilizers can also be incorporated.

EXAMPLE

The following describes how the various novel polymers and their precursors were prepared, and the influence of certain variables upon their properties. Also reported are results on comparative polymers.

1. Preparation of 1,2-bis($\beta$-cyanoethoxyethane)
   (NC—$(CH_2)_2$O—$(CH_2)_2$—O—$(CH_2)_2$—CN)

To a 5 liter double walled (for water cooling) glass reactor with a bottom drain and stopcock were charged 930 grams (15 moles) of ethylene glycol and 45.6 grams of 40% aqueous KOH solution. Some 1620 grams (30.0 moles) of acrylonitrile (NC—CH=$CH_2$) were then added dropwise, with stirring, at such a rate that the temperature was kept below 35° C. After the addition was completed the mixture was stirred an additional hour and then allowed to stand overnight. The mixture was then neutralized to a pH of 7 by the addition of 6 molar HCL. After washing was saturated NaCl solution three times, the product was separated from the aqueous layer, dried over $CaCl_2$ and passed through an $Al_2O_3$ column to insure that all basic materials had been removed. The yield obtained was 90% of theoretical.

2. Preparation of 4,7-dioxadecamethylenediamine
   ($NH_2(CH_2)_3$—O—$(CH_2)_2$—O—$(CH_2)_3$—$NH_2$)

To a 800 milliliter hydrogenation reactor were charged 150 grams of 1,2-bix ($\beta$-cyanoethoxyethane), 230 milliliters of dioxane and about 50 grams of Raney Co. After purging the air, the reactor was pressurized with hydrogen up to 2000 p.s.i. and heated to 100° C. As the hydrogen was consumed additional hydrogen was added until pressure remained constant. Upon cooling, the pressure was released and the catalyst was filtered. The dioxane was removed by atmospheric distillation. The remaining mixture was distilled in a 3 ft. spinning band distillation unit. The diamine distilled at 123°–124° C. and 3.75 mm Hg. About 98 grams of 99.95% pure materials was obtained. The material can be referred to as 30203 diamine.

3. Preparation and Polymerization of Poly (4,7-dioxadecamethylene terephthalamide) (N-30203-T)

The 30203 diamine, 17.8 grams dissolved in 50 milliliters of ethanol, was added with stirring to a heated slurry of 16.6 grams of terephthalic acid in 200 milliliters of ethanol. Upon completion of this addition, 30 milliliters of water were added. After solution had occurred, the mixture was filtered hot. Then 10 milliliters of isopropanol were added. Upon cooling, the polymer salt precipitated. The salt was recrystallized from a mixture of 200 milliliters of ethanol and 400 milliliters of methanol. The yield was 21.3 grams. A 1% aqueous solution of the recrystallized salt had a pH=7.1. Its melting point was 221° C.

About 40 grams of the polymer salt were charged to a heavy walled glass polymer "D" tube. Then the neck of the tube was constricted for sealing and purged of air by evacuating and filling with nitrogen 5 times. Finally the tube was heated in an aluminum block for 2 hours at 200° C. After cooling the tip of the tube was broken off and the remaining portion was bent over at a 45° angle by heating and then connected to a manifold and purged of with nitrogen-vacuum cycles. The tubes were heated at 282° C. under nitrogen at atmospheric pressure for one hour, then under a vacuum for 2 hours, using dimethylphthalate vapor baths. On cooling, the tubes were broken and the polymer plug crushed to $\frac{1}{8}$ inch size pieces. Inherent viscosities ranged from 0.9 to 1.1 in meta-cresol solution at 100° F. The polymer was glossy white in color. Its melting point was 258° C.

4. Polymer Melt Blending

Suitable amounts of dried N-30203-T polymer and nylon-6 were charged to a large test tube having two openings in the rubber stopper. The openings were for a helical stirrer and a nitrogen inlet. The container was purged of air. Afterwards the nitrogen filled container was heated using a suitable liquid-vapor bath. The mixture of the two polymers was agitated with the helical stirrer powered by an air motor for the required time. Before allowing the molten polymer to cool the stirrer was lifted to drain the polymer. After solidification the material was broken up and dried for spinning.

To determine how few repeating units could be contained within a block and still retain its polymeric properties the data shown in Table I was obtained. To obtain the data three samples of caprolactam were polymerized at the various conditions shown in Table I. Subsequently average molecular weights and melting points were determined. The foregoing two tests were also made on a sample of a purchased polymer. The obtained average molecular weight divided by the molecular weight of the repeat unit in the polymer gives the average value of number of repeating units (i.e., z) in a block. This value is also reported in Table I. A plot on semi-log graph paper of Runs 1–4 and an extrapolation of the foregoing indicates that with a value of 4 for z, the melting point would be an estimated 188° C. Thus since there is only a decrease of 21° in melting point despite the substantial decrease of 207 units in z, one can conclude that four repeating units can be contained in a block without adversely changing the properties of the polymer.

TABLE I

| | | Resultant Polymer (Caprolactam) | | |
|---|---|---|---|---|
| Run | Conditions | Average Molecular Weight[1] | Value of "z"[2] | Melting Point. °C.[3] |
| 1 | Purchased | 23,809 | 211 | 209 |
| 2 | 3 hrs @ 250° C. and 1 ml $H_2O$ | 7,874 | 70 | 205 |
| 3 | 3 hrs @ 250° C. and 4 ml $H_2O$ | 6,211 | 55 | 201 |
| 4 | 2 hrs @ 250° C. | 2,024 | 18 | 188 |

TABLE I-continued

| | | Resultant Polymer (Caprolactam) | | |
|---|---|---|---|---|
| Run | Conditions | Average Molecular Weight[1] | Value of "z"[2] | Melting Point. °C.[3] |
| 5 | monomer (caprolactam) | 113 | 1 | 70 |

[1] Molecular weight is based on amino ends.
[2] Average molecular weight divided by 113 which is molecular weight of nylon's monomer, i.e. caprolactam
[3] Melting point determined by Differential Scanning Colorimeter; onset value.

5. Polymer Spinning and Drawing

After the aforementioned melt blending the polymer was charged to a micro spinning apparatus consisting of stainless steel tube (⅜ inch O.D.×12 inches), with a 0.037 inch capillary. The tube was heated with a vapor bath to the temperature consistent with the polymer. Generally about 245° C. was used. Nitrogen was swept through the polymer until the polymer melted and sealed the capillary. After the polymer was completely melted and a uniform temperature had been reached (about 30 minutes) the nitrogen pressure was increased by about 30-50 p.s.i.g. (depending on polymer melt viscosity) to extrude the polymer.

The fiber, as it left the tube, was drawn on a series of rollers and wound up on a bobbin. The first roller or feed roll was traveling at 35 ft/min. The filament was wrapped 5 times around this. After crossing a hot pipe maintained at about 50° C. the filament was wrapped around the second roller or a draw roll (5 times) which speed varied depending on the draw ratio required (130-175 ft/min). Unlike commercial draw rolls, the fiber tended to abrade itself; that is the fiber coming off rubbed against fiber coming on. This made high draw ratios difficult to obtain. The third roll had a removable bobbin and was driven at a slightly lower speed than the draw roller.

Draw ratio refers to the ratio of the speed of the second roller or draw roll to the speed of the first roller or feed roll. Thus if the second roller was traveling at 175 feet per minute and the first roller at 35 feet per minute the draw ratio is 5 (175/35). This difference in speeds of the rollers stretches the fiber. Stretching or drawing orientates the molecules, i.e., places them in a single plane running in the same direction as the fiber.

6. Results of Tests and Comparative Runs

The accompanying Table II contains data obtained on N-30203-T//6. Also is data obtained on cotton and nylon-6.

Comparison of Runs 1 and 2 indicates that the inclusion of a substantial amount of N-30203-T into nylon-6 favorably influences moisture regain and initial modulus and does not adversely change other physical properties, i.e., tenacity, of the prepared fiber. Also, the resulting N-30203-T//6 fiber has moisture regain approaching that of cotton.

Tenacity, elongation (to rupture) and initial modulus (textile modulus) and the methods for obtaining such values are defined and described in Kirk-Othmer, ENCYCLOPEDIA OF CHEMICAL TECHNOLOGY, 2nd Edition, Vol. 20, Textile Testing.

Moisture regain refers to the amount of moisture a dried sample of fiber picks up in a constant relative humidity atmosphere. Measurement of this property was carried out using a series of humidity chambers made from desiccators containing suitable saturated salt solutions (i.e., $NaNO_2=65\%$, $NaCl=75\%$, $KCl=85\%$ and $Na_2SO_3=95\%$) at room temperature.

To determine moisture regain first the sample of the fiber was dried in a vacuum desiccator over $P_2O_5$. After a constant weight was obtained the sample was placed in one of the appropriate chambers. The chamber was then evacuated to speed up equilibrium. The fiber remained in the chamber until a constant weight was obtained. The increase in weight of the sample over the dried sample was the amount of moisture regained.

Boil off refers to placing the fiber in boiling water for a specified length of time. Afterward the weight loss is determined. Also after following the procedure described for determining moisture regain the incremental increase in percent moisture regain at 65% relative humidity was determined. Boil off can be considered as akin to a dye treatment.

The increase in moisture regain as a result of boil off is thought to be best understood by the following explanation. By placing the fiber in boiling water portions of the fiber relax. Thus the orientated amorphous sections tend to open up. Boiling off speeds the relaxation of this unnatural state. Heating the fiber, by other than placing in boiling water, will also relax the fiber.

Analogous results are obtained when one of the following: nylon-6,6; nylon-6,10; nylon-11, MXD-6 or PACM-12 is used in place of nylon-6 in the polymer melt blending step. Also analogous results are obtained when in step (3), terephthalic acid is replaced with one of the following: 1,3-naphthalene dicarboxylic acid; 1,4-naphthalene dicarboxylic acid; 1,5-naphthalene dicarboxylic acid; 1,6-napthalene dicarboxylic acid; 1,8-naphthalene dicarboxylic acid; 2,4-naphthalene dicarboxylic acid; 2,5-naphthalene dicarboxylic acid and 2,6-naphthalene dicarboxylic acid. Also, when the ethylene glycol of step (1) is replaced with one of the following glycols: trimethylene, propylene, tetramethylene and methyltetramethylene, analogous results are obtained.

TABLE II

COMPARATIVE PROPERTIES OF BLOCK COPOLYMER OF POLY(DIOXA-ARYLAMIDE) AND POLYAMIDE

| | | Percent of 30203-T in Material | Blending Temperature, °C. | Minutes | Fiber Properties* | | | Moisture Regain at % Relative Humidity | | | |
|---|---|---|---|---|---|---|---|---|---|---|---|
| | | | | | Tenacity[a] | Elongation[a] | Initial Modulus[a] | 95 | 85 | 75 | 65 |
| Run | Material | | | | | | | | | | |
| 1 | nylon-6 | 0 | n.a. | n.a. | 3.7 | 45 | 11.5 | 7.6 | 5.8 | 4.5 | 4.1 |
| 2 | N-30203-T//6 | 20 | 295 | 30 | 3.6 | 44 | 17 | 9.6 | 7.7 | 5.7 | 4.2 |

TABLE II-continued
COMPARATIVE PROPERTIES OF BLOCK COPOLYMER OF POLY(DIOXA-ARYLAMIDE) AND POLYAMIDE

| Run | Material | Percent of 30203-T in Material | Blending Temperature, °C. | Minutes | Fiber Properties* | | | Moisture Regain at % Relative Humidity | | | |
|---|---|---|---|---|---|---|---|---|---|---|---|
| | | | | | Tenacity[a] | Elongation[a] | Initial Modulus[a] | 95 | 85 | 75 | 65 |
| 3 | cotton | 0 | n.a. | n.a. | — | — | — | 14.5 | 11.8 | 9.5 | 7.6 |

[a]Draw ratio 3.7; ambient relative humidity, 40 monofilaments twisted together, average 7 or 8 samples per test, and after boil off.
n.a. Not Applicable
*Units for tenacity and initial modulus are grams denier, whereas elongation is expressed as a percent.

TABLE III
COMPARISON OF CERTAIN POLYMERS

| Material No. | Polymer | Wt. % N-30203-T | Type of Polymer | Fiber Moisture Retention (wt. %)* |
|---|---|---|---|---|
| 1 | Nylon-6 | 0 | Homo | 11.2 |
| 2 | N-30203-T | 100 | Homo | 11.5 |
| 3 | (N-30203-T) (N-6) | 30 | Mixture of two homos | 11.8 |
| 4 | N-30203-T//N-6 | 30 | Block | 14.7 |

*Method disclosed by L. S. Welow, H. M. I. Zufle and A. U. McDonald, in Textile Research Journal, Vol. 22, page 261, 1952.

Table III discloses additional comparative data as to fiber moisture retention. Nylon-6, N-30203-T (homopolymer) a physical mixture of N-30203-T and nylon 6, and N-30203-T//6 (block) are compared as to moisture retention. The data demonstrates that polymer N-30203-T//6 has a substantially higher value then the other mentioned polymers.

The moisture retention data reported in Table III was determined by placing sample in boiling water for five minutes, then removing and placing in room temperature water and allowing it to stand overnight. Then the sample is removed from the water and centrifuged at 6500 RPM or 8400 RPM for 20 minutes to remove surface water; then weighed and dried overnight at 80° C. and then reweighed. The difference in weight was the amount of water retained.

The invention claimed is:

1. A block copolymer having a molecular weight of about 5000–100,000 and the following repeating structural formula:

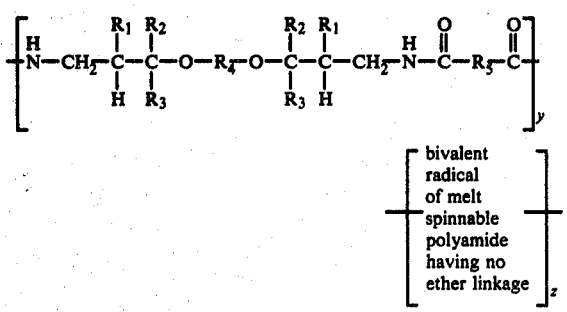

where
$R_1$, $R_2$ and $R_3$ are selected from the group consisting of H, $C_1$–$C_{10}$ alkyls and $C_3$–$C_{10}$ isoalkyls;
$R_4$ is selected from the group consisting of $C_1$–$C_{10}$ alkylenes and $C_3$–$C_{10}$ isoalkylenes;
$R_5$ is a $C_6$–$C_{14}$ arylene; and
$y = 4$–$200$
$z = 4$–$200$.

2. A copolymer according to claim 1 wherein the copolymer is hydrophilic.

3. A copolymer according to claim 2 wherein the copolymer has a percent moisture regain of at least 4% at a relative humidity of 65%.

4. A copolymer according to claim 1 wherein the bivalent radical polyamide is selected from the group consisting of nylon-6, nylon-6,6 and PACM-12.

5. A copolymer according to claim 4 wherein the copolymer is hydrophilic.

6. A copolymer according to claim 5 wherein the copolymer has a percent moisture regain of at least 4% at a relative humidity of 65%.

7. A copolymer according to claim 6 wherein $R_1$, $R_2$ and $R_3$ are H and $R_4$ is a $C_1$–$C_{10}$ alkylene.

8. A copolymer according to claim 7 wherein $R_4$ is a $C_2$ alkylene and $R_5$ is a $C_6$ arylene.

9. A fiber obtained by spinning the copolymer of claim 1.

10. A fiber obtained by spinning the copolymer of claim 7.

11. A fiber obtained by spinning the copolymer of claim 8.

12. A fiber obtained by melt spinning the copolymer of claim 1.

13. A fiber obtained by melt spinning the copolymer of claim 7.

14. A fiber obtained by melt spinning the copolymer of claim 8.

15. A monofilament obtained by extrusion of the copolymer of claim 1.

16. A monofilament obtained by extrusion of the copolymer of claim 7.

17. A monofilament obtained by extrusion of the copolymer of claim 8.

18. A yarn obtained by twisting fibers of the copolymer of claim 1.

19. A yarn obtained by twisting fibers of the copolymer of claim 7.

20. A yarn obtained by twisting fibers of the copolymer of claim 8.

21. A fabric obtained by weaving yarn of the copolymer of claim 1.

22. A fabric obtained by weaving yarn of the copolymer of claim 7.

23. A fabric obtained by weaving yarn of the copolymer of claim 8.

24. A fabric obtained by knitting yarn of the copolymer of claim 1.

25. A fabric obtained by knitting yarn of the copolymer of claim 7.

26. A fabric obtained by knitting yarn of the copolymer of claim 8.

27. A fabric obtained by knitting monofilament of the copolymer of claim 1.

28. A fabric obtained by knitting monofilament of the copolymer of claim 7.

29. A fabric obtained by knitting monofilament of the copolymer of claim 8.

30. A nonwoven fabric obtained by laminating the copolymer of claim 1.

31. A nonwoven fabric obtained by laminating the copolymer of claim 7.

32. A nonwoven fabric obtained by laminating the copolymer of claim 8.

33. A fiber comprising the copolymer of claim 1.

34. A fiber comprising the copolymer of claim 8.

35. A fiber comprising the copolymer of claim 10.

36. A monofilament comprising the copolymer of claim 1.

37. A monofilament comprising the copolymer of claim 7.

38. A monofilament comprising the copolymer of claim 8.

39. A yarn comprising the copolymer of claim 1.

40. A yarn comprising the copolymer of claim 7.

41. A yarn comprising the copolymer of claim 8.

42. A fabric comprising the copolymer of claim 1.

43. A fabric comprising the copolymer of claim 7.

44. A fabric comprising the copolymer of claim 8.

45. A nonwoven fabric comprising the copolymer of claim 1.

46. A nonwoven fabric comprising the copolymer of claim 7.

47. A nonwoven fabric comprising the copolymer of claim 8.

* * * * *